United States Patent [19]

Takeuchi et al.

[11] Patent Number: 5,467,368
[45] Date of Patent: Nov. 14, 1995

[54] SPREAD SPECTRUM SIGNAL DEMODULATOR

[75] Inventors: Yoshio Takeuchi; Toshinori Suzuki, both of Tokyo, Japan

[73] Assignee: Kokusai Denshin Denwa Kabushiki Kaisha, Japan

[21] Appl. No.: 333,074

[22] Filed: Nov. 1, 1994

[30] Foreign Application Priority Data

Nov. 5, 1993 [JP] Japan .................................... 5-299085

[51] Int. Cl.⁶ .......................... H04B 1/707; H04J 13/04
[52] U.S. Cl. ...................... 375/206; 375/200; 375/205; 375/208; 375/209; 380/34; 370/18
[58] Field of Search ............................. 375/1, 200–210; 380/34

[56] References Cited

U.S. PATENT DOCUMENTS

| | | | |
|---|---|---|---|
| 4,189,677 | 2/1980 | Cooper et al. | 375/1 |
| 4,553,101 | 11/1985 | Mathis | 375/1 |
| 4,774,715 | 9/1988 | Messenger | 375/1 |
| 4,933,952 | 6/1990 | Albrieux et al. | 375/1 |
| 4,942,591 | 7/1990 | Nease et al. | 375/1 X |

OTHER PUBLICATIONS

"Near–Far Resistance of Multiuser Detectors in Asynchronous Channels", R. Lupas, S. Verdu, *IEEE Transactions on Communications,* vol. 38, No. 4, Apr. 1990, pp. 496–508.

*Primary Examiner*—Bernarr E. Gregory
*Attorney, Agent, or Firm*—Westman, Champlin & Kelly

[57] ABSTRACT

A demodulator receiving as input signal a sum of a plurality of spread spectrum signals is disclosed. The demodulator comprises means for obtaining a correlation between a spreading code assigned to each of spread spectrum signals contained in the input signal and the input signal for each spread spectrum signal symbol and making the correlation thus obtained to be a 0-th detected correlation, a 1-st interference canceller stage for receiving as inputs the input signal and the 0-th detected correlation and outputting 1-st residual error signal, 1-st detected correlation and sum of the 0-th and 1-st detected correlations, and a plurality of interference canceller stages operable similarly to the 1-st interference canceller stage by receiving as input the output signal of the preceding interference canceller stage.

4 Claims, 13 Drawing Sheets

FIG. 1 PRIOR ART

FIG. 2
PRIOR ART $$r(t) = \sum_{i} \sum_{k=1}^{K} a_k \cdot b_k(i) \cdot c_k(t-iT-\tau_k) + n(t) \qquad \text{Eq. 1}$$

$$y_k(i) = \frac{1}{T} \int_{iT+\tau_k}^{(i+1)T+\tau_k} r(t) \cdot c_k^*(t-iT-\tau_k) dt \qquad \text{Eq. 2}$$

$$u_k(t) = \sum_{i} y_k(i) \cdot c_k(t-iT-\tau_k-D) \qquad \text{Eq. 3}$$

$$v_n(t) = \sum_{\substack{k=1 \\ k \neq n}}^{k} u_k(t) \qquad \text{Eq. 4}$$

$$w_n(t) = r(t-D) - v_n(t) \qquad \text{Eq. 5}$$

$$z_n(i) = \frac{1}{T} \int_{iT+\tau_n+D}^{(i+1)T+\tau_n+D} w_n(t) \cdot c_n^*(t-iT-\tau_n-D) dt \qquad \text{Eq. 6}$$

$$\tau_1 = \tau_2 = \cdots = \tau_k = 0 \qquad \text{Eq. 7}$$

$$\vec{r}(i) \equiv \left( r(iT), r(iT+\triangle T), r(iT+2\triangle T), \cdots, r(iT+(M-1)\triangle T) \right)^T \qquad \text{Eq. 8}$$
$$M \equiv \frac{T}{\triangle T}$$

$$\vec{b}(i) \equiv \left( a_1 b_1(i), a_2 b_2(i), \cdots, a_k b_k(i) \right)^T \qquad \text{Eq. 9}$$

$$\vec{c}_k = \left( c_k(0), c_k(\triangle T), c_k(2\triangle T), \cdots, c_k((M-1)\triangle T) \right)^T \qquad \text{Eq. 10}$$

FIG. 3
PRIOR ART

FIG. 4
PRIOR ART $$C \equiv (\vec{c}_1, \vec{c}_2, \cdots, \vec{c}_k)^T \qquad \text{Eq. 11}$$

$$\vec{n}(i) \equiv \big(n(iT), n(iT+\triangle T), n(iT+2\triangle T), \cdots, n(iT+(M-1)\triangle T)\big)^T \qquad \text{Eq. 12}$$

$$\vec{r}(i) = C^T \vec{b}(i) + \vec{n}(i) \qquad \text{Eq. 13}$$

$$y_k(i) = \frac{1}{M} \vec{c}_k^{*T} \vec{r}(i) \qquad \text{Eq. 14}$$

$$\vec{y}(i) \equiv (y_1(i), y_2(i), \cdots, y_k(i))^T \qquad \text{Eq. 15}$$

$$\vec{y}(i) = \frac{1}{M} C^* \vec{r}(i) \qquad \text{Eq. 16}$$

$$\vec{y}(i) = H\vec{b}(i) + \frac{1}{M} C^* \vec{n}(i) \qquad \text{Eq. 17}$$

$$H \equiv \frac{1}{M} C^* C^T \qquad \text{Eq. 18}$$

$$\vec{d}(i) = H^{-1} \vec{y}(i) \qquad \text{Eq. 19}$$

$$\vec{d}(i) \equiv (d_1(i), d_2(i), \cdots, d_k(i))^T \qquad \text{Eq. 20}$$

$$\vec{d}(i) = \vec{b}(i) + \vec{n}'(i)$$
$$\vec{n}'(i) \equiv H^{-1} \left(\frac{1}{M} C^* \vec{n}(i)\right) \qquad \text{Eq. 21}$$

$$d_k(i) = a_k \cdot b_k(i) + n'_k(i)$$
$$n'_k(i) : \text{K-TH ELEMENT OF } \vec{n}'(i) \qquad \text{Eq. 22}$$

$$y_k^{(0)}(i) = \frac{1}{T} \int_{iT+\tau_k}^{(i+1)T+\tau_k} r(t) \cdot c_k^*(t-iT-\tau_k)dt \qquad \text{Eq. 23}$$

$$u_k^{(j)}(t) = \sum_i y_k^{(j-1)}(i) \cdot c_k(t-iT-\tau_k-jD) \qquad \text{Eq. 24}$$

$$v^{(j)}(t) = \sum_{k=1}^{K} u_k^{(j)}(t) \qquad \text{Eq. 25}$$

$$e^{(j)}(t) = e^{(j-1)}(t-D) - v^{(j)}(t) \qquad \text{Eq. 26}$$

$$y_k^{(j)}(i) = \frac{1}{T} \int_{iT+\tau_k+jD}^{(i+1)T+\tau_k+jD} e^{(j)}(t) \cdot c_k^*(t-iT-\tau_k-jD)dt \qquad \text{Eq. 27}$$

$$d_k^{(j)}(i) = d_k^{(j-1)}(i) + y_k^{(j)}(i) \qquad \text{Eq. 28}$$

$$p_k^{(j)}(t) = \sum_i d_k^{(j-1)}(i) \cdot c_k(t-iT-\tau_k-jD) \qquad \text{Eq. 29}$$

$$q^{(j)}(t) = \sum_{k=1}^{K} p_k^{(j)}(t) \qquad \text{Eq. 30}$$

$$e^{(j)}(t) = r(t-jD) - q^{(j)}(t) \qquad \text{Eq. 31}$$

$$d_k^{(j)}(i) = \sum_{n=0}^{j} y_k^{(n)}(i) \qquad \text{Eq. 32}$$

$$y_k(i) = y_k^{(0)}(i) \qquad \text{Eq. 33}$$

$$u_k(t) = u_k^{(1)}(t) \qquad \text{Eq. 34}$$

$$v_n(t) = v^{(1)}(t) - u_n^{(1)}(t) \qquad \text{Eq. 35}$$

$$w_n(t) = e^{(1)}(t) + u_n^{(1)}(t) \qquad \text{Eq. 36}$$

$$\begin{aligned}
z_n(i) &= \frac{1}{T} \int_{iT+\tau_n+D}^{(i+1)T+\tau_n+D} \left(e^{(1)}(t) + u_n^{(1)}(t)\right) \cdot c_n^*(t-iT-\tau_n-D)\,dt \\
&= y_n^{(1)}(i) + \frac{1}{T} \int_{iT+\tau_n+D}^{(i+1)T+\tau_n+D} u_n^{(1)}(t) \cdot c_n^*(t-iT-\tau_n-D)\,dt \\
&= y_n^{(1)}(i) + \frac{1}{T} \int_{iT+\tau_n+D}^{(i+1)T+\tau_n+D} \sum_m y_n^{(0)}(m) \cdot c_n(t-mT-\tau_n-D) \cdot c_n^*(t-iT-\tau_n-D)\,dt \\
&= y_n^{(1)}(i) + \frac{1}{T} \int_{iT+\tau_n+D}^{(i+1)T+\tau_n+D} y_n^{(0)}(i) \cdot |c_n(t-iT-\tau_n-D)|^2\,dt \\
&= y_n^{(1)}(i) + \frac{1}{T} \int_{iT+\tau_n+D}^{(i+1)T+\tau_n+D} y_n^{(0)}(i)\,dt \\
&= y_n^{(1)}(i) + y_n^{(0)}(i) \\
&= d_n^{(1)}(i) \qquad \text{Eq. 37}
\end{aligned}$$

FIG. 14

$$\begin{cases} \vec{y}^{(0)}(i) \equiv \left(y_1^{(0)}(i), y_2^{(0)}(i), \cdots, y_K^{(0)}(i)\right)^T \\ \vec{u}_k^{(j)}(i) \equiv \left(u_k^{(j)}(iT+jD), u_k^{(j)}(iT+jD+\triangle T), u_k^{(j)}(iT+jD+2\triangle T), \cdots, u_k^{(j)}(iT+jD+(M-1)\triangle T)\right)^T \\ \vec{v}^{(j)}(i) \equiv \left(v^{(j)}(iT+jD), v^{(j)}(iT+jD+\triangle T), v^{(j)}(iT+jD+2\triangle T), \cdots, v^{(j)}(iT+jD+(M-1)\triangle T)\right)^T \\ \vec{e}^{(j)}(i) \equiv \left(e^{(j)}(iT+jD), e^{(j)}(iT+jD+\triangle T), e^{(j)}(iT+jD+2\triangle T), \cdots, e^{(j)}(iT+jD+(M-1)\triangle T)\right)^T \\ \vec{y}^{(j)}(i) \equiv \left(y_1^{(j)}(i), y_2^{(j)}(i), \cdots, y_K^{(j)}(i)\right)^T \\ \vec{d}^{(j)}(i) \equiv \left(d_1^{(j)}(i), d_2^{(j)}(i), \cdots, d_K^{(j)}(i)\right)^T \end{cases} \quad \text{Eq. 38}$$

$$\vec{y}^{(0)}(i) = \frac{1}{M} C^* \vec{r}(i) \quad \text{Eq. 39}$$

$$\vec{u}_k^{(j)}(i) = y_k^{(j-1)}(i) \vec{c}_k \quad \text{Eq. 40}$$

$$\vec{v}^{(j)}(i) = \sum_{k=1}^{K} \vec{u}_k^{(j)}(i) \quad \text{Eq. 41}$$

$$\vec{e}^{(j)}(i) = \vec{e}^{(j-1)}(i) - \vec{v}^{(j)}(i) \quad \text{Eq. 42}$$

$$\vec{y}^{(0)}(i) = \frac{1}{M} C^* \vec{r}(i) \quad \text{Eq. 43}$$

$$\vec{d}^{(j)}(i) = \sum_{m=0}^{j} \vec{y}^{(m)}(i) \quad \text{Eq. 44}$$

FIG. 15

$$\vec{y}^{(j)}(i) = \frac{1}{M} C^* (\vec{e}^{(j-1)}(i) - \vec{v}^{(j)}(i))$$

$$= \frac{1}{M} C^* (\vec{e}^{(j-1)}(i) - C^T \vec{y}^{(j-1)}(i))$$

$$= \frac{1}{M} C^* \vec{e}^{(j-1)}(i) - \frac{1}{M} C^* C^T \vec{y}^{(j-1)}(i)$$

$$= \vec{y}^{(j-1)}(i) - H \vec{y}^{(j-1)}(i)$$

$$= (E - H) \vec{y}^{(j-1)}(i)$$

$$= (E - H)^j \vec{y}^{(0)}(i) \qquad \text{Eq. 45}$$

$$\vec{d}^{(N)}(i) = \sum_{j=0}^{N} \vec{y}^{(j)}(i) = \sum_{j=0}^{N} (E - H)^j \vec{y}^{(0)}(i) \qquad \text{Eq. 46}$$

$$\sum_{j=0}^{N} (E - H)^j \rightarrow H^{-1} \qquad \text{Eq. 47}$$

$$\vec{d}^{(N)}(i) \rightarrow H^{-1} \vec{y}^{(0)}(i) \qquad \text{Eq. 48}$$

SPREAD SPECTRUM SIGNAL DEMODULATOR

BACKGROUND OF THE INVENTION

1. Field of the Invention

This invention relates to spread spectrum signal demodulator and, more particularly, to spread spectrum signal demodulator used for cellular communication systems, indoor wireless communication systems, wireless LAN (local area network) systems, etc.

2. Description of the Prior Art

In systems dealing with spread spectrum signals for code division multiple access (CDMA), a plurality of signals are transmitted in the same band. As is well known in the art, in such a system inter-signal interference is generated in dependence on the correlation among codes assigned to individual signals. The characteristics of the signals are deteriorated more and more with increasing number of signals involved. Further, when there are signal level fluctuations, interference received by low level signals from high level signals is relatively great. In this case, the characteristics of the low level signals are greatly deteriorated.

Figure 1:
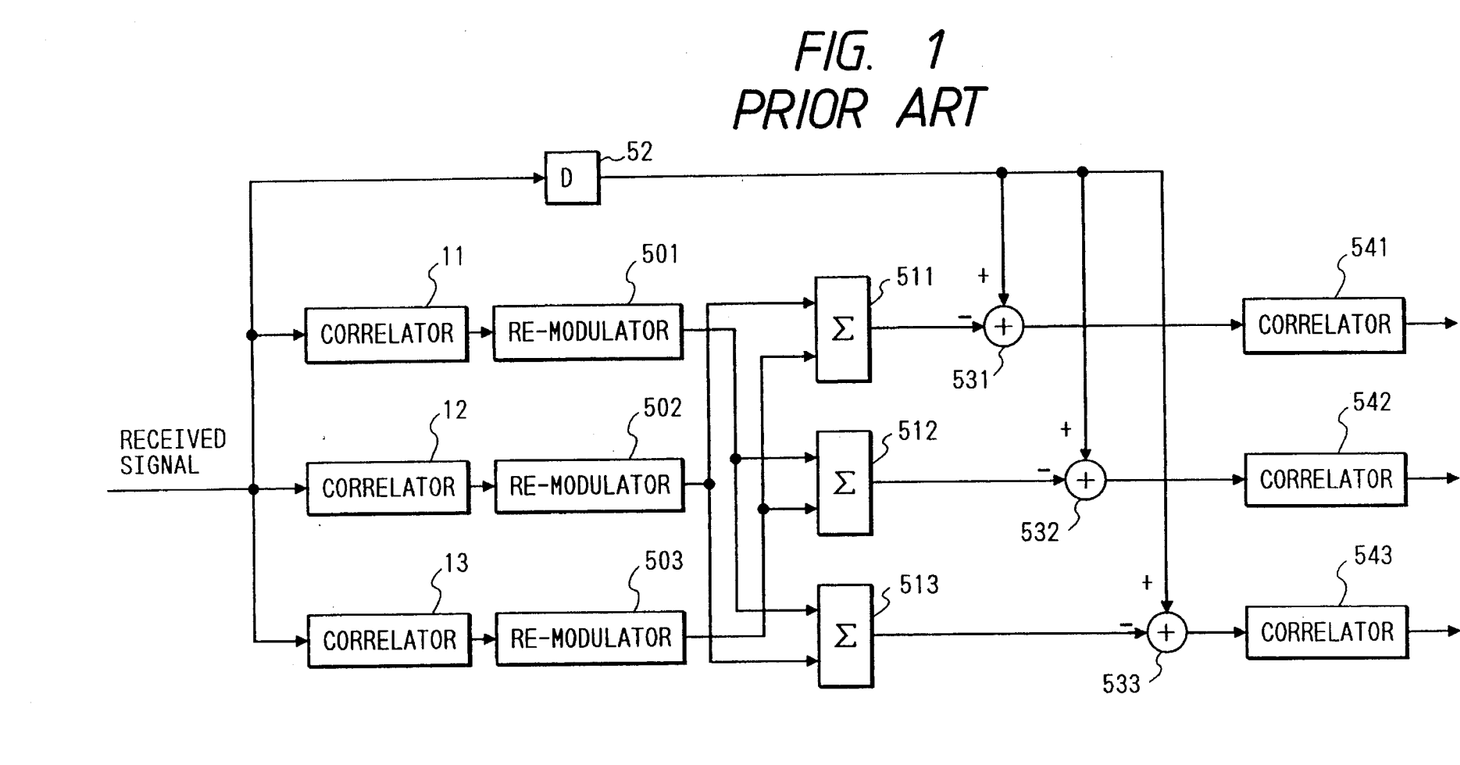
FIG. 1 is a block diagram showing a prior art example of spread spectrum signal demodulator based on replica signal cancellation.

There are some proposed methods for improving signal characteristics by reducing such inter-signal interference. One such method is called a replica signal cancellation method. In this method, replica signals produced from original signals are subtracted from the original signals to reduce the interference. This can be realized with a system as shown in FIG. 1. In the illustrated system, the number K of signals involved is 3. The system comprises correlators 11 to 13, re-modulators 501 to 503, adders 511 to 513, a delay unit 52, subtractors 531 to 533, and correlators 541 to 543.

As a spectrum spreading system, a direct spreading system is assumed. A received signal r(t) at instant t is expressed by formula 1 in FIG. 2. Here, baseband signal processing is assumed, and all the signals are assumed to be represented by complex signals.

Figure 2:
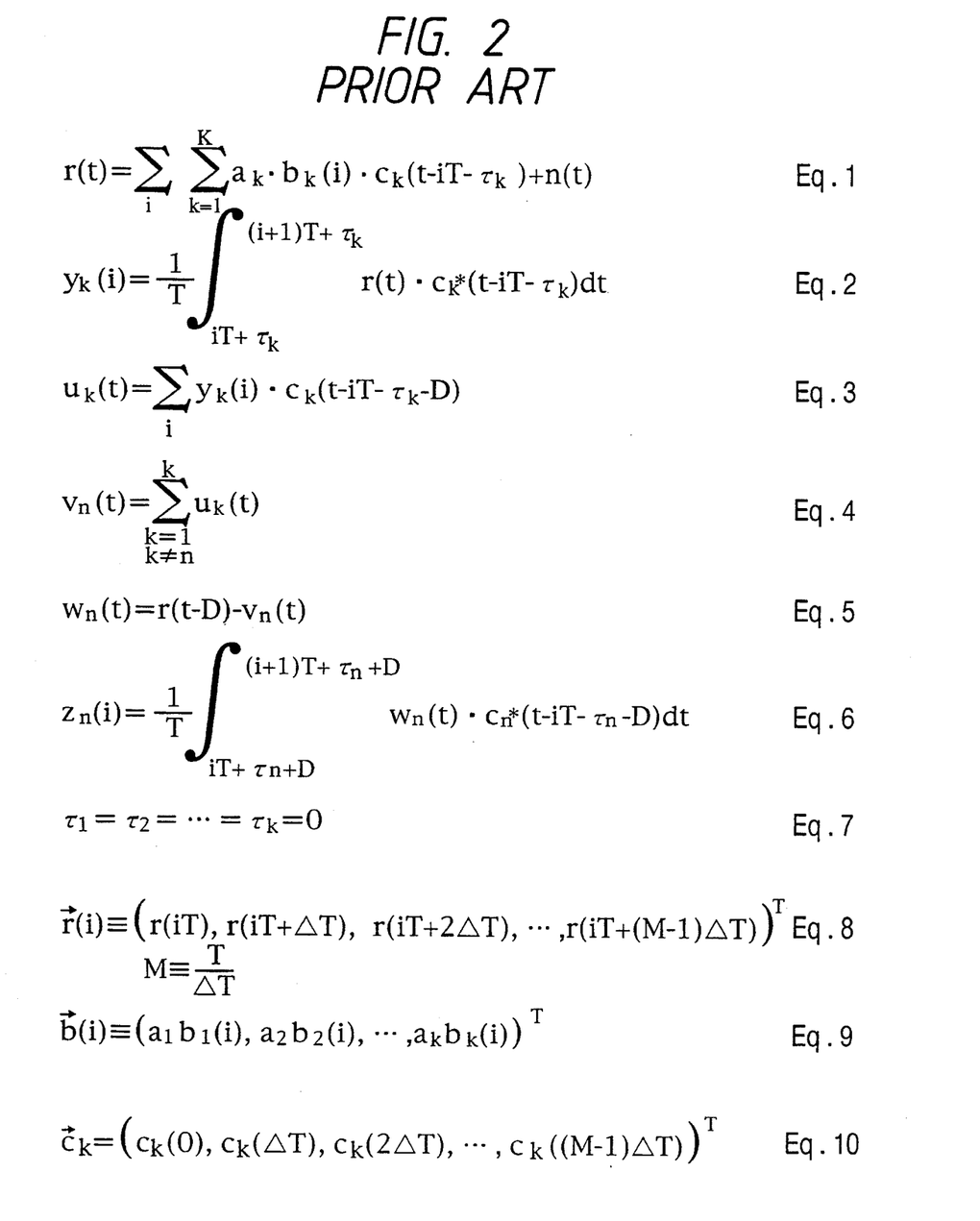
FIG. 2 shows formulas 1 to 10.

In the formula 1, K represents the number of simultaneously transmitted signals, $a_k$ the reception amplitude level of the k-th signal, $b_k(i)$ the information bit of the i-th symbol of the k-th signal, $c_k(\tau)(|c_k(\tau)|)=1$, $0 \leq \tau < T$, T: symbol cycle) the spreading code of the k-th signal, $\tau_k$ the delay of the k-th signal, and n(t) the noise added on the transmission line.

With the received signal r(t), the correlators 11 to 13 each perform a process as expressed by formula 2 in FIG. 2 on each signal symbol to output a correlation $y_k(i)$. Complex conjugate is represented by *. The re-modulators 501 to 503 each re-modulate each correlation as expressed by formula 3 in FIG. 2 to generate a replica signal $u_k(t)$.

Then, when cancelling interference by the other signals than the n-th signal, the adders 511 to 513 derive the sum $v_n(t)$ of the replica signals of the other signals than the n-th signal through an operation as expressed by formula 4 in FIG. 2.

Subsequently, the subtractors 531 to 533 derive a signal $w_n(t)$ as a result of cancellation of the other signals than the n-th signal by subtracting the signal $v_n(t)$ from a delayed received signal r(t−D) as expressed by formula 5 in FIG. 2.

Then, with respect to the signal $w_n(t)$ the correlators 541 to 543 derive a correlation $z_n(i)$ as expressed by formula 6 in FIG. 2 for each symbol, thus attaining correlation detection of the interference-cancelled signal.

The processes as represented by the above formulas 4 and 5 are performed with respect to each of the 1-st to K-th signals, whereby the interference cancellation and the correlation detection are attained with respect to all the signals. The correlation detection outputs with respect to the individual signals that are obtained in the above way are phase synchronized or processed likewise and bit judged. In this way, the individual signals can be demodulated.

Figure 3:
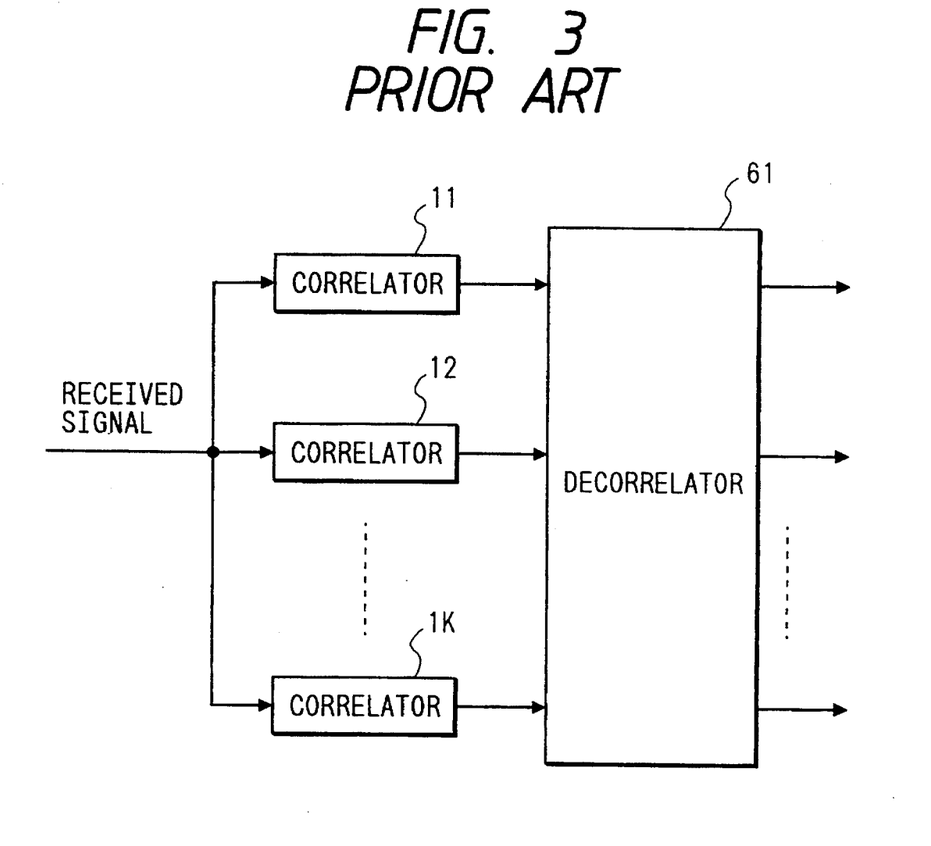
FIG. 3 is a block diagram showing a prior art example of spread spectrum demodulator based on decorrelation.

Another proposed method of improving the characteristics of signals through inter-signal interference cancellation is called a decorrelating method. In this method, decorrelation is performed by using known intercode correlation. The method can be carried out by a system as shown in FIG. 3, comprising correlators 11, 12, ..., 1K and a decorrelator 61.

As in the previous case, it is assumed that the received signal is expressed by the formula 1. Further, for the brevity of the description it is assumed that there is inter-signal symbol timing synchronization and that the condition expressed by formula 7 in FIG. 2 is satisfied. In this method, the received signal r(t) is sampled at a sufficiently short interval $\Delta T$, and each symbol sample is represented by a vector of formula 8 in FIG. 2. In the formula 8, $(\ )^T$ represents transposition.

Further, the product of the reception amplitude level and bit information of signal is represented by a vector of formula 9 in FIG. 2. Likewise, the spreading code $c_k(\tau)$ of each signal is sampled at an interval $\Delta T$ and represented by a vector of formula 10 in FIG. 2. Further, with all the spreading code vectors a spreading code matrix C is defined as given by formula 11 in FIG. 2. Further, the noise n(t) is sampled at an interval $\Delta T$, and the sample for each symbol is represented by a vector of formula 12 in FIG. 2. Using the above expressions, the formula 1 can be modified to formula 13 in FIG. 4.

Figure 4:
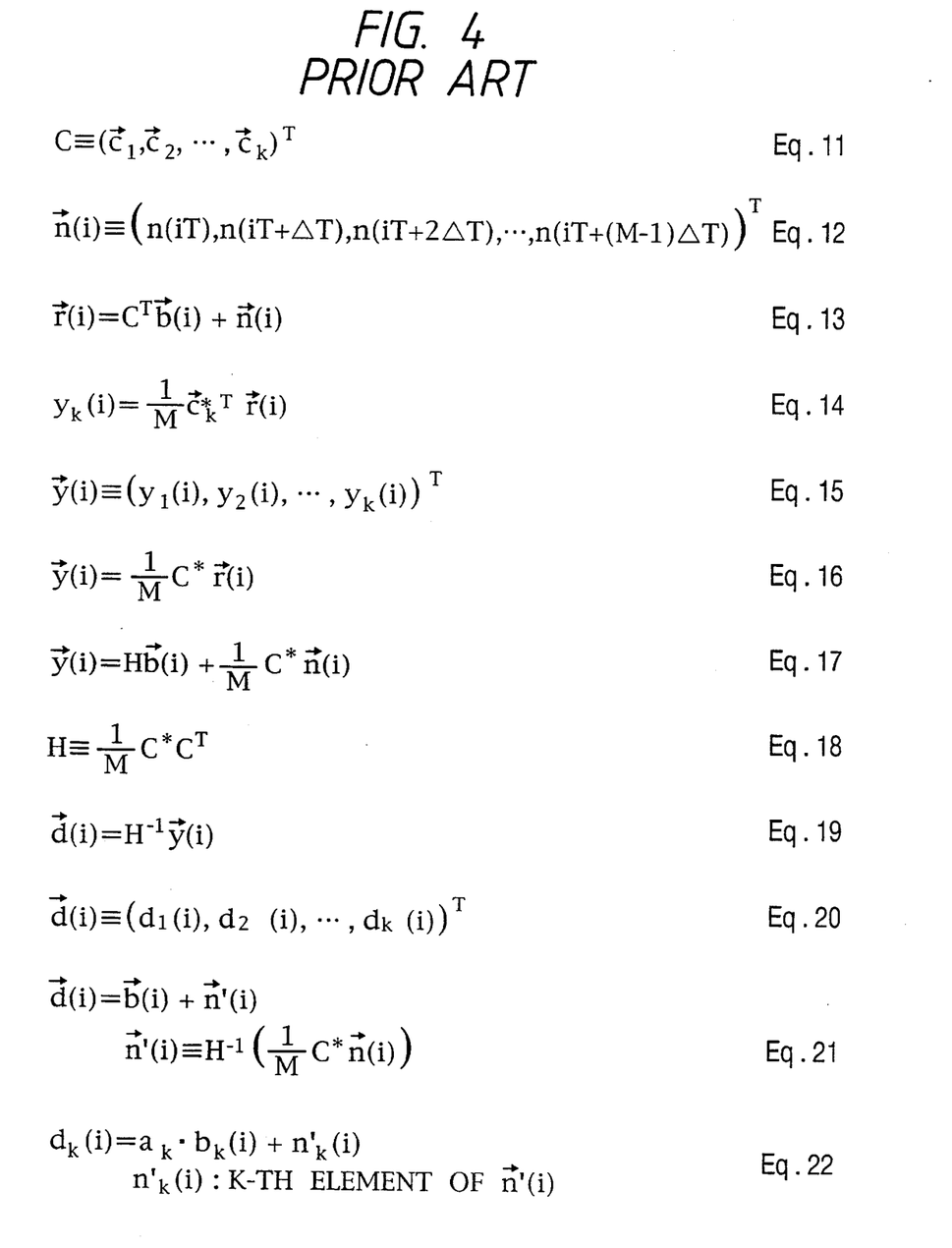
FIG. 4 shows formulas 11 to 22.

Further, the process of the above formula 2 performed by the correlators 11 to 1K can be expressed by formula 14 in FIG. 4. Here, the outputs of the correlators 11 to 1K are represented by vectors defined by formula 15 in FIG. 4. By so doing, the formula 14 can be written as formula 16 in FIG. 4. By substituting the formula 13 into the formula 16, formula 17 in FIG. 4 can be obtained. Here, H is defined by formula 18 in FIG. 4 as a correlation matrix representing inter-code correlations.

The decorrelator 61 performs a process after formula 19 in FIG. 4 on the correlator outputs. Here, vector d(i) is represented by formula 20 in FIG. 4. Each element $d_k(i)$ is the result of decorrelation from the individual correlator outputs. Since the code matrix C is known, the correlation matrix H can be calculated in advance, and also the inverse matrix $H^{-1}$ can be obtained in advance. The signal obtained by the above decorrelation is expressed by formula 21 in FIG. 4 by substituting the formula 17 into the formula 19.

For the sake of the brevity, d(i) may be expressed by a formula for each vector element, that is, by formula 22 in FIG. 4. This means that the decorrelated signal $d_k(i)$ is the sum of the product of the amplitude level $a_k$ and information bit $b_k(l)$ of the original signal and a noise component $n'_k(i)$, and is not influenced by the simultaneously received other signals at all. This means cancellation of the inter-signal interference, that is, interferencecancelled detection signals are obtainable. Each interference-cancelled detection signal is phase synchronized or likewise processed and bit judged. In this way, each signal can be demodulated.

While the decorrelating method has been described in connection with its operation when there is symbol synchronization, in the case of absence of synchronization, like the case of presence of synchronization the decorrelation is obtainable as shown in "Near-far Resistance of Multiuser Detectors in Asynchronous Channels" (R. Lupas, S. Verdu, IEEE Trans. Com. Vol. 38, No. 4, April 1990). More specifically, regarding a period MT which is sufficiently long with respect to K asynchronous signals and covers a plurality of (i.e., M) symbols to be a period of one synchronous symbol, it can be considered that MK synchronous signals are transmitted in the period MT. Thus, it is possible to obtain decorrelation in the asynchronous signal case through decorrelation in the case of the MK signals.

In the prior art replica signal cancellation method, influence of interference signals appears in the correlator output obtainable according to the formula 2 due to inter-code correlation. Therefore, the replica signal generated according to the formula 3 contains an error due to the interference. More specifically, the interference-cancelled signal $Z_n(i)$ obtained according to the formula 5 is not perfectly free from interference, and therefore its characteristics are deteriorated compared to the case in which interference is perfectly cancelled. Particularly, in cases when a large number of signals are involved and when the level differences among signals are large, the residual interference are greatly influential, thus resulting in great deterioration of the signal characteristics.

Further, in the prior art replica signal cancellation method, the process of the formula 4 has to be performed for each signal. This means that in the case of digital process arithmetic operation has to be performed a number of times substantially equal to the square of the number K of the involved signals for each sample together with the process of the formula 5. Therefore, if the number of signals is large, it dictates an enormous process amount.

The prior art decorrelating method permits obtaining perfectly interference-cancelled detection signal. However, the method poses the following problem. When the number of signals is changed, the size of the correlation matrix H is changed. In this case, it is necessary to calculate afresh the inverse matrix $H^{-1}$ which is used for the decorrelation. Further, when spreading codes are altered or changed, the spreading code matrix C defined by the formula 11 is changed, thus changing the correlation matrix H defined by the formula 18. Therefore, again it becomes necessary to calculate the inverse matrix $H^{-1}$ afresh. In the case of absence of symbol synchronization, a change in the signal delay similarly changes the correlation of the spreading codes to one another, thus changing the correlation matrix defined for the asynchronous signal case. Therefore, again in this case it becomes necessary to calculate the inverse matrix used for the decorrelation afresh.

The size of the matrix H is K×K in the case of presence of the symbol synchronization and MK×MK in the asynchronous case. As an example, where the number K of signals is 100, an inverse matrix to a matrix with a size of 100×100 has to be calculated even if there is symbol synchronization. In the case of absence of symbol synchronization, using a correlation matrix of (M=) 10 symbols, for instance, it is necessary to calculate an inverse matrix to a matrix of 1,000×1,000 in size. This means an enormous operation amount. In cases where signals are frequently turned on and off due to voice activation or the like or in cases of mobile communication where there are quick changes in delay, it is difficult to calculate the above inverse matrix by real time calculation, thus making it impossible to adopt the decorrelating receiver.

Further, using spreading code which has a greater length than the symbol length, is equivalent to using different codes for the individual symbols. In this case, the correlation matrix H varies with the symbol, that is, it is necessary to adopt different inverse matrices $H^{-1}$ for the individual symbols. Therefore, the problem of operation amount increase is posed again.

SUMMARY OF THE INVENTION

The invention seeks to solve the above problems inherent in the prior art, and it has an object of providing a spread spectrum signal demodulator, which permits an equivalent process to that in the prior art replica signal cancellation method to be effected with a reduced operation amount.

Another object of the invention is to provide a spread spectrum signal demodulator, which, when slight circuit scale increase is allowed, is superior to the prior art replica signal cancellation system, permits demodulation characteristics close to those of the decorrelating method to be attained, permits interference cancellation to be obtained with far less operations than in the decorrelating method, and can readily cope with spreading code alterations and signal delay changes.

A feature of the invention resides in a spread spectrum signal demodulator receiving as input signal a sum of a plurality of spread spectrum signals, which comprises means for obtaining the correlation of a spreading code assigned to each of the spread spectrum signals contained in the input signal and the input signal for each symbol of each spread spectrum signal and making the correlation thus obtained to be the 0-th detected correlation, a 1-st interference canceller stage for receiving the input signal and the 0-th detected correlation and outputting a 1-st residual error signal, a 1-st detected correlation and the sum of the 0-th and 1-st detected correlation, and a plurality of interference canceller stages operable similarly to said 1-st interference canceller stage by receiving as an input the output signal of the preceding interference canceller stage.

The correlation detection output obtained through the interference cancellation in the 1-st stage according to the invention is equivalent to that obtainable in the prior art replica signal cancellation method. In the process according to the invention, however, unlike the prior art replica signal cancellation system, correlation to code is obtained afresh with respect to the residual error signal which is obtained by subtracting the sum of all the replica signals from the received signal. Thus, in the case of the digital process, the number of times of addition to be made for each sample is equal to the number K of signals, and it is small compared to that in the prior art replica signal cancellation system. Thus, particularly when the number K of signals is large, it is possible to attain demodulation characteristics equivalent to those in the replica signal cancellation system with less operation amount.

Further, when performing the multiple stage interference cancellation according to the invention, the interference cancellation is made repeatedly with respect to the residual error signal. Thus, the interference signal component that is contained in the final correlation detection output is very slight compared to the case of the prior art replica signal cancellation method, and the characteristics of the prior art decorrelating method can be approached more and more by increasing the number of stages. Further, according to the invention the process can be carried out without deriving the correlation matrix H and the inverse matrix $H^{-1}$ thereto. Thus, the overall operation amount may be less than that in the decorrelating method. For this reason, spreading code alterations and signal delay changes can be readily coped with without need of much operation amount.

DETAILED DESCRIPTION OF THE PREFERRED EMBODIMENTS

Figure 5:
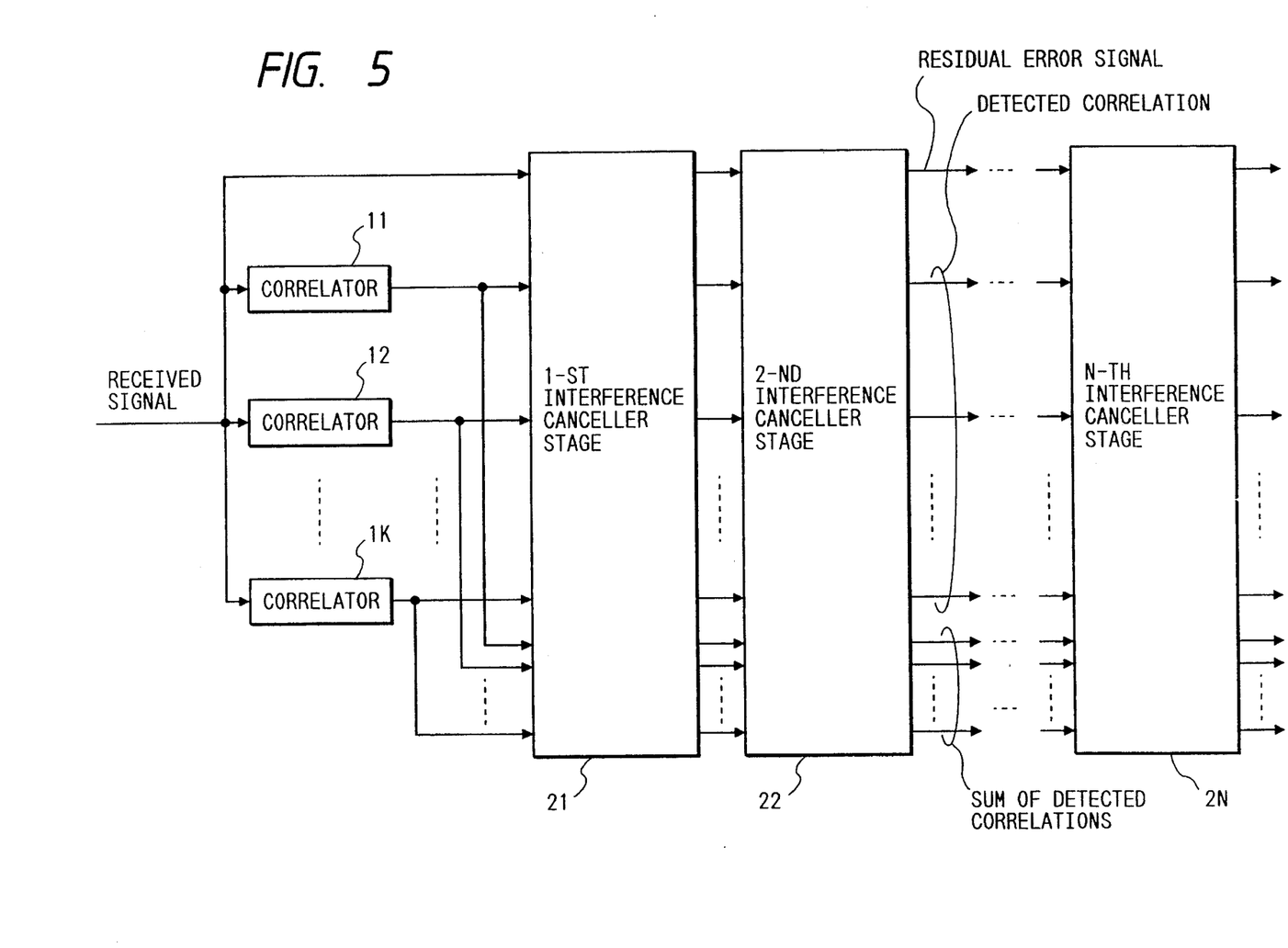
FIG. 5 is a block diagram showing a first embodiment of the spread spectrum signal demodulator according to the invention.
Figure 6:
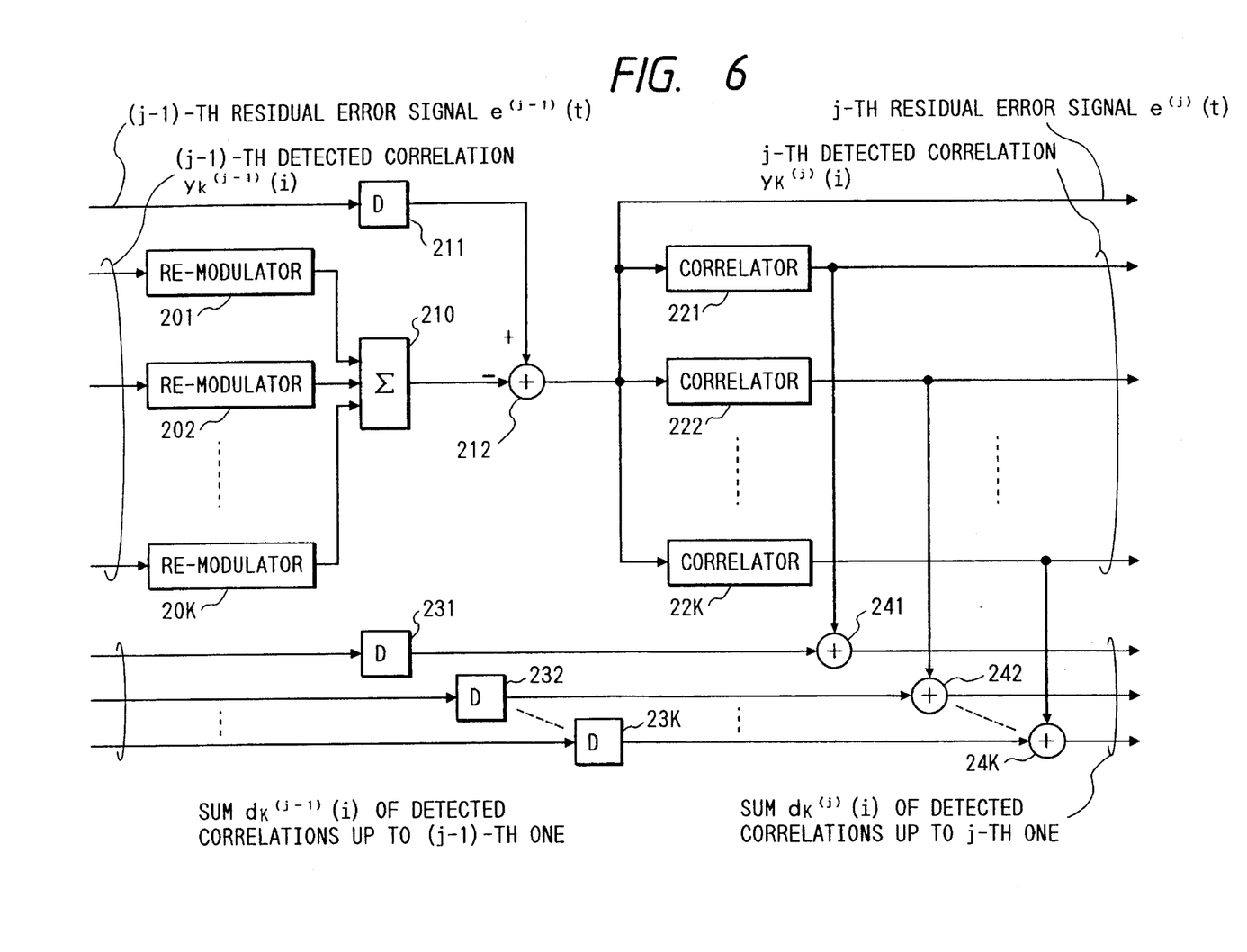
FIG. 6 is a block diagram showing a specific example of interference canceller shown in FIG. 5.

The invention will now be described in detail with reference to the drawings. FIGS. 5 and 6 are block diagrams showing an embodiment of the spread spectrum signal demodulator for performing multiple stage interference cancellation according to the invention. FIG. 5 is the spread spectrum signal demodulator as a whole, comprising correlators 11, 12, ..., 1K and interference cancellers 21, 22, ..., 2N. The 1-st to N-th interference canceller stages 21 to 2N have the same or like construction.

FIG. 6 is a block diagram showing a specific example of interference canceller shown in FIG. 5, comprising re-modulators 201, 202, ..., 20K, an adder 210, a delay unit 211, a subtractor 212, correlators 221, 222, ..., 22K, delay units 231, 232, ..., 23K and adders 241, 242, ..., 24K. Here, there are N interference cancellation stages.

A specific example of the re-modulator 201 will now be described with reference to FIG. 7. The re-modulators 201, 202, ..., 20K have the same or like construction, and here the re-modulator 201 will be described typically.

Figure 7:
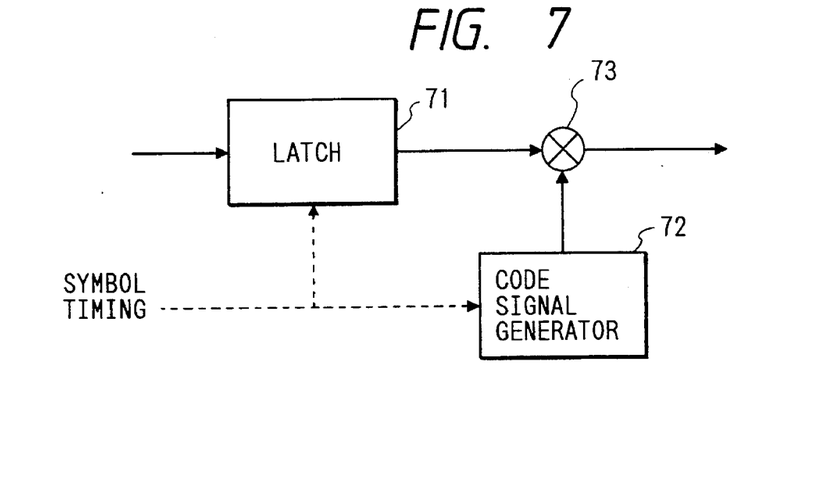
FIG. 7 is a block diagram showing a specific example of re-modulator.

Referring to FIG. 7, a signal which is input for each symbol is latched in a latch 71, and its value is held for one symbol period before being output. A code signal generator 72 generates code signal which is set with respect to a symbol timing.

A multiplier 73 outputs the result of multiplification of the output of the latch and the code signal.

Figure 8:
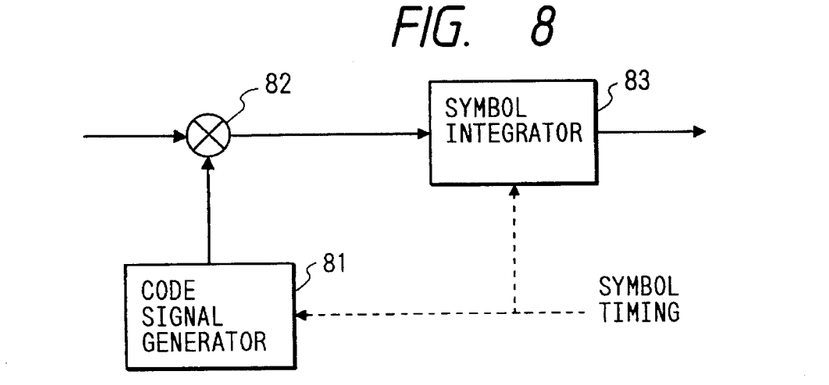
FIG. 8 is a block diagram showing a specific example of correlator.

FIG. 8 is a block diagram showing a specific example of the correlator 221. The correlators 221, 222, ..., 22K have the same or like construction, and here the correlator 221 will be described typically.

Referring to FIG. 8, a code signal generator 81 generates a code signal which is set with respect to a symbol timing. A multiplier 82 outputs the result of multiplification of the code signal and the input signal. A symbol integrator 83 outputs the result of integration of the input signal over one symbol, and it has a construction as shown in FIG. 9, for instance.

Figure 9:
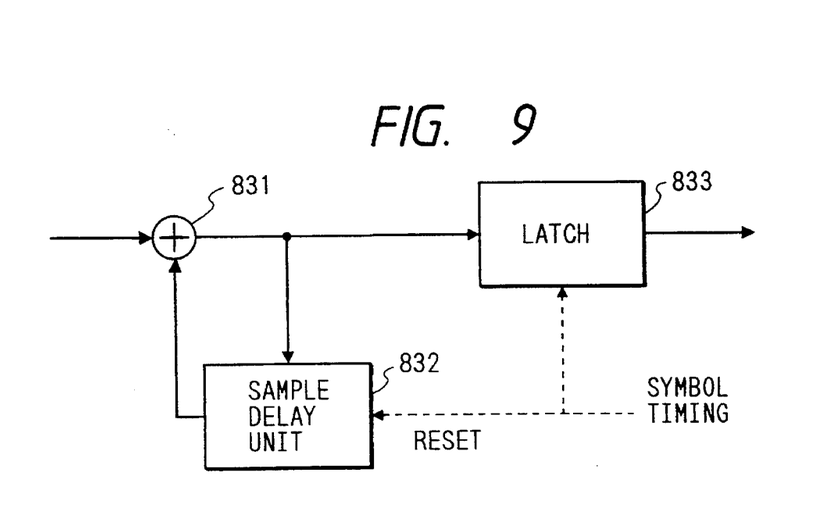
FIG. 9 is a block diagram showing a specific example of symbol integrator shown in FIG. 8.

Referring to FIG. 9, the output of a sample delay unit 832 is reset to zero for each symbol timing. An adder 831 adds together the input signal and the output of the delay unit 832. The result of addition is delayed by the delay unit 832, the output of which is added again to the input signal by the adder 831. This sequence of operation is repeatedly performed in one symbol period. Thus, at the instant of the next symbol timing the output of the adder 831 is the integral of the input signal over one symbol. In response to the symbol timing, the integral is latched in a latch 833, and its value is held for one symbol period before it is output.

While the above description has concerned with an example in which the process is carried out with hardware, this is by no means limitative, and it is possible to realize a similar process with software by using a circuit comprising a general-purpose processor, a memory and so forth.

The operation of the embodiment will now be described. The correlators 11 to 1K shown in FIG. 5 each perform a process expressed by formula 23 in FIG. 10 for each symbol of each signal with respect to the received signal r(t) expressed by the formula 1. The obtained 0-th detected correlation $y_k^{(0)}(i)$ is input to the 1-st interference canceller stage 21. In the following description, baseband signal processing is assumed under the assumption that all the signals are expressed as complex signals. However, it is possible to realize a similar process in the IF band or the like.

The j-th ($1 \leq j \leq N$) interference canceller stage shown in FIG. 6 performs the process by receiving as inputs the (j−1)-th residual error signal $e^{(j-1)}(t)$, the (j−1)-th detected correlation $y_k^{(j-1)}(i)$ and the sum $d_k^{(j-1)}(i)$ of the 0-th to (j−1)-th detected correlations. Here, the 0-th residual error signal $e^{(0)}(t)$ means the received signal r(t). The re-modulators 201 to 20K each perform re-modulation of formula 24 in FIG. 10 for each detected correlation to generate a replica signal $u_k^{(j)}(t)$. The adder 210 derives the sum $v^{(j)}(t)$ of all the replica signals $u_k^{(j)}(t)$ after formula 25 in FIG. 10.

Figure 10:
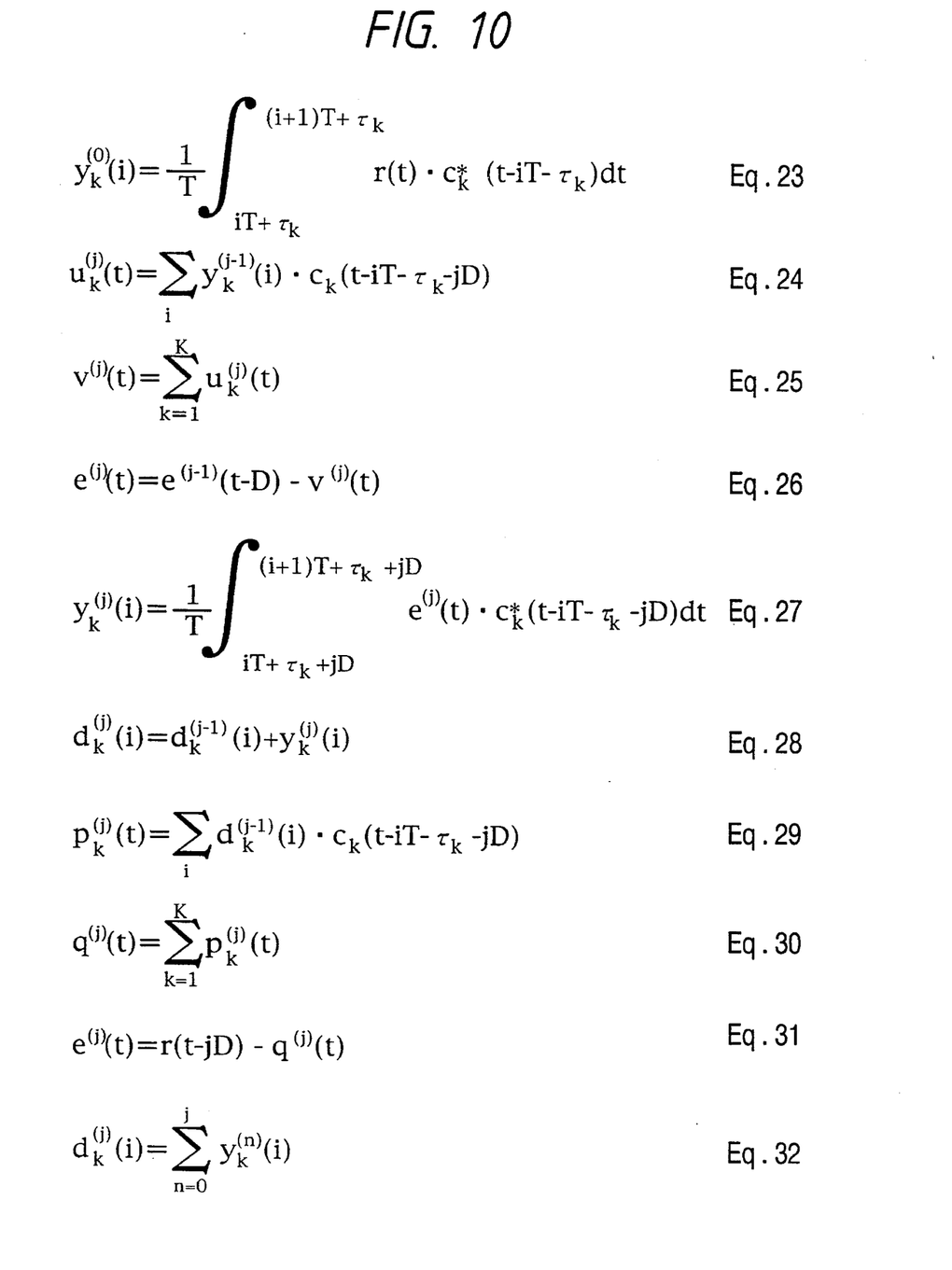
FIG. 10 shows formulas 23 to 32.

The subtractor 212 subtracts the signal $v^{(j)}(t)$ obtained after the formula 25 in FIG. 10 from a signal obtained by delaying the (j−1)-th residual error signal $e^{(j-1)}(t)$ as shown by formula 26 in FIG. 10 and thus outputs the j-th residual error signal $e^{(j)}(t)$.

The correlators 221 to 22K each perform a process expressed by formula 27 in FIG. 10 for each symbol of each signal and outputs the j-th detected correlation $y_k^{(j)}(i)$. The adders 241 to 24K each add the obtained j-th detected correlation $y_k^{(j)}(i)$ to the sum $d_k^{(j-1)}(i)$ the detected correlations up to the (j−1)-th one after formula 28 in FIG. 10 and output the sum $d_k^{(j)}(i)$ of the detected correlations up to the j-th one. In the (j−1)-th stage, $d_k^{(j-1)}(i)$ has been obtained earlier by timer D than $y_k^{(j)}(i)$, and in the circuit structure a corresponding delay time is provided by the delay units 231 to 23K.

The j-th residual error signal $e^{(j)}(t)$, j-th detected correlation $y_k^{(j)}(i)$ and sum $d_k^{(j)}(i)$ of the detected correlations up to the j-th one, which have been obtained in the above way, are output from the j-th interference canceller stage. The sum $d_k^{(N)}(i)$ of the detected correlations up to the N-th one, which is output from the N-th, i.e., last, interference canceller stage, is phase synchronized and then bit judged. In this way, the individual signals are demodulated.

In this embodiment, as will become clear hereinunder, the sum $d_k^{(N)}(i)$ of the detected correlations approaches the detection value $d_k(i)$ in the prior art decorrelating method by increasing the number N of stages, and thus it is possible to obtain a detection signal which is substantially perfectly free from interference.

Figure 11:
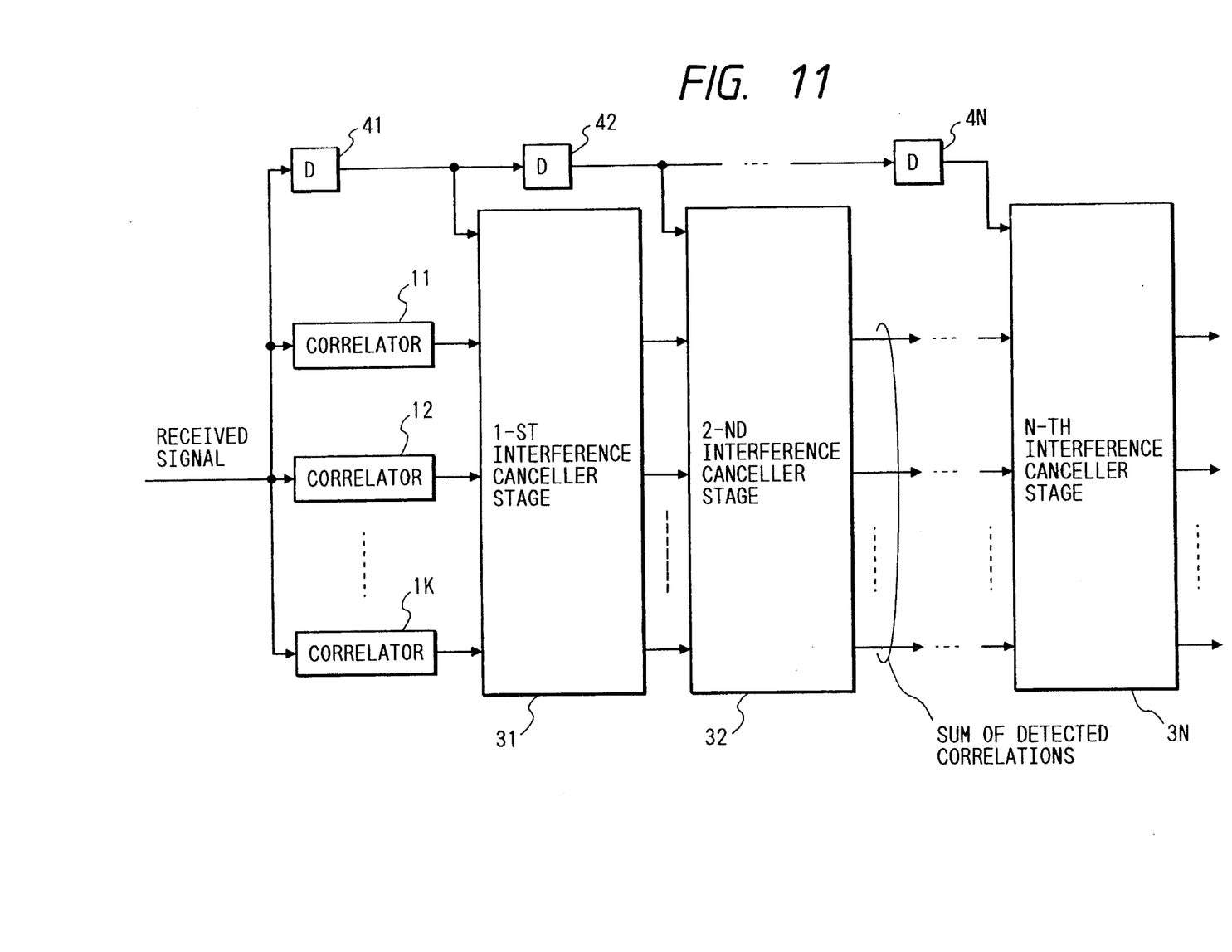
FIG. 11 is a block diagram showing a second embodiment of the spread spectrum signal demodulator according to the invention.
Figure 12:
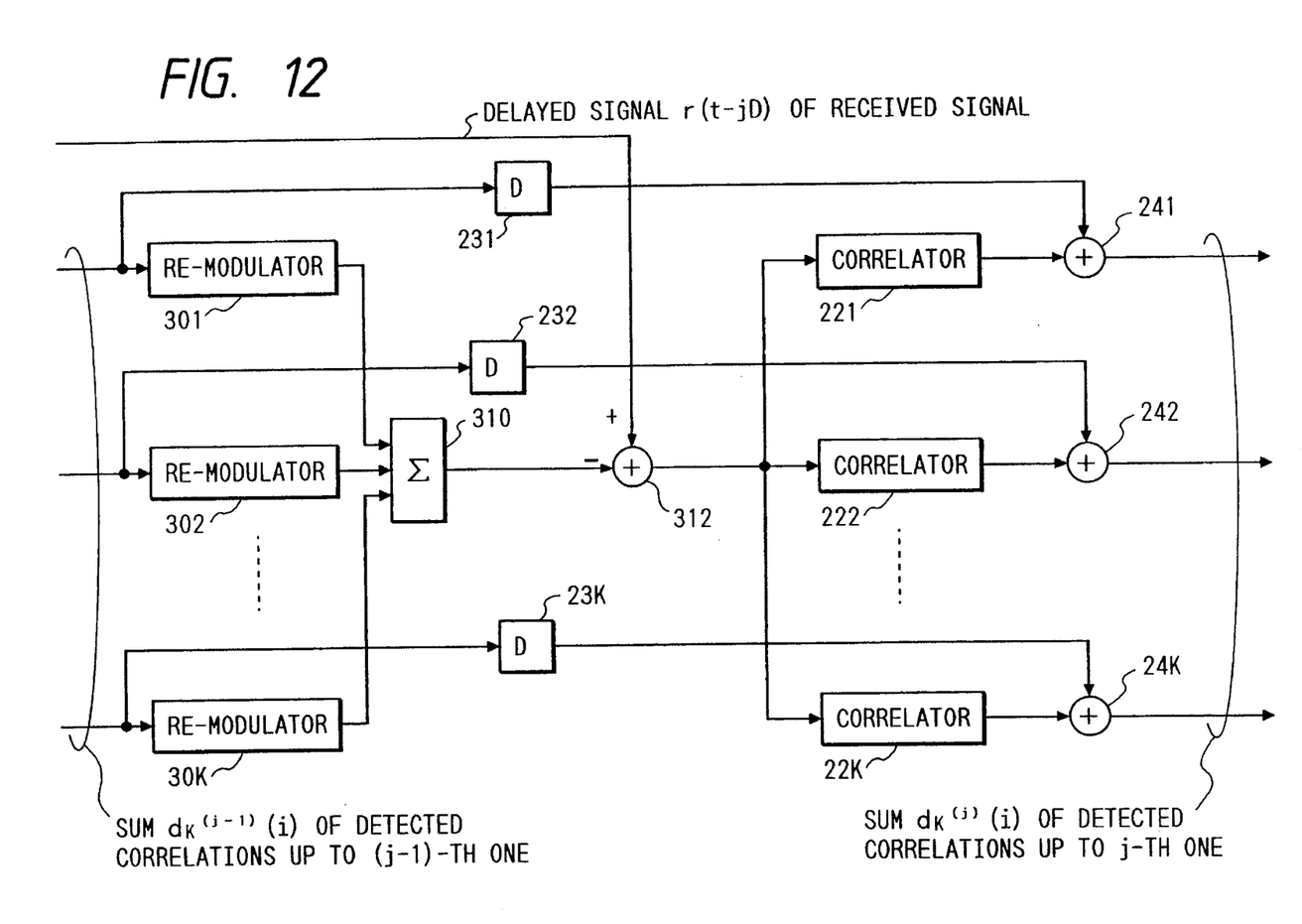
FIG. 12 is a block diagram showing a specific example of interference canceller shown in FIG. 11.

A second embodiment of the invention will now be described. FIGS. 11 and 12 are block diagrams showing a second embodiment of the invention. As shown in FIG. 11, this embodiment of the spread spectrum signal demodulator comprises correlator 11, 12, . . . , 1K, interference canceller stages 31, 32, . . . , 3N, and delay units 41, 42, . . . , 4N. The interference canceller stages 31 to 3N, as shown in FIG. 12, each include re-modulators 301, 302, . . . , 30K, an adder 310, a subtractor 312, correlators 221, 222, . . . , 22K, delay units 231, 232, . . . , 23K, and adders 241, 242, . . . , 24K.

The correlators 11 to 1K in FIG. 11 operate entirely in the same way as the operation of the system shown in FIG. 5. Specifically, a process expressed by the formula 23 is performed with respect to the received signal r(t) expressed by the formula 1 for each symbol of each signal, and the obtained 0-th detected correlation $y_k^{(0)}(i)$ is input to the 1-st interference canceller stage 31.

The j-th interference canceller stage shown in FIG. 12 performs its process by receiving as inputs a signal r(t-jD) obtained by delaying the received signal and the sum $d_k^{(j-1)}(i)$ of the 0-th to (j-1)-th detected correlations. First, re-modulators 301 to 30K each perform re-modulation of formula 29 in FIG. 10 to generate a replica signal $p_k^{(j)}(t)$. Adder 310 derives the sum $q^{(j)}(t)$ of all the replica signals $p_k^{(j)}(t)$ after formula 30 in FIG. 10.

Subtractor 312 subtracts the signal $q^{(j)}(t)$ from the delayed signal r(t-jD) after formula 31 in FIG. 10 to obtain the j-th residual error signal $e^{(j)}(t)$.

The formula 28 satisfies formula 32 in FIG. 10. By substituting the formulas 32, 29 and 30 into the formula 31, and modifying the result by using the formulas 24 and 25, the formula 26 can be obtained. Thus, it will be seen that the j-th residual error signal $e^{(j)}(t)$ obtained through the processes of the formulas 29, 30 and 31 in the structure shown in FIG. 12, is entirely the same as the j-th residual error signal $e^{(j)}(t)$ obtained through the processes of the formulas 24 to 26 in the structure shown in FIG. 6. The process performed by the correlators 221 to 22K and the process of obtaining the sum $d_k^{(j)}(i)$ of detected correlations up to the j-th one, are the same as those performed in the structure shown in FIG. 6, and they are performed after the formulas 27 and 28. The sum $d_k^{(j)}(i)$ of the detected correlations up to the j-th one as obtained in the above way, is output from the j-th interference canceller stage.

The sum $d_k^{(N)}(i)$ of the detected correlations up to the N-th one, output from the N-th or last interference canceller stage, is phase synchronized or likewise processed and bit judged. In this way, the individual signals can be demodulated. With the second embodiment, it is possible to expect the same effects as in the previous first embodiment.

In the above first and second embodiments, where the number of simultaneously transmitted signals is subject to increase or decrease, such increase or decrease can be coped with by constructing the circuit such as to be able to cope with the maximum estimated number of signals and operating circuit corresponding to correlators and re-modulators for the number of actually transmitted signals. Further, alteration of the employed spreading codes that is caused by a signal number increase or decrease, may be coped with by correspondingly altering the codes used in the corresponding circuits such as correlators, re-modulators, etc. Further, a spreading code cycle covering a plurality of symbol cycles, is equivalent to using different spreading codes each for each symbol. Thus, this case can be coped with similarly to the case of the spreading code alteration.

Further, a case in which the delay of each transmitted signal is changed as in mobile communication, can be coped with by providing instantaneous signal delay $\tau_k$ to the corresponding correlator and re-modulator.

Figure 13:
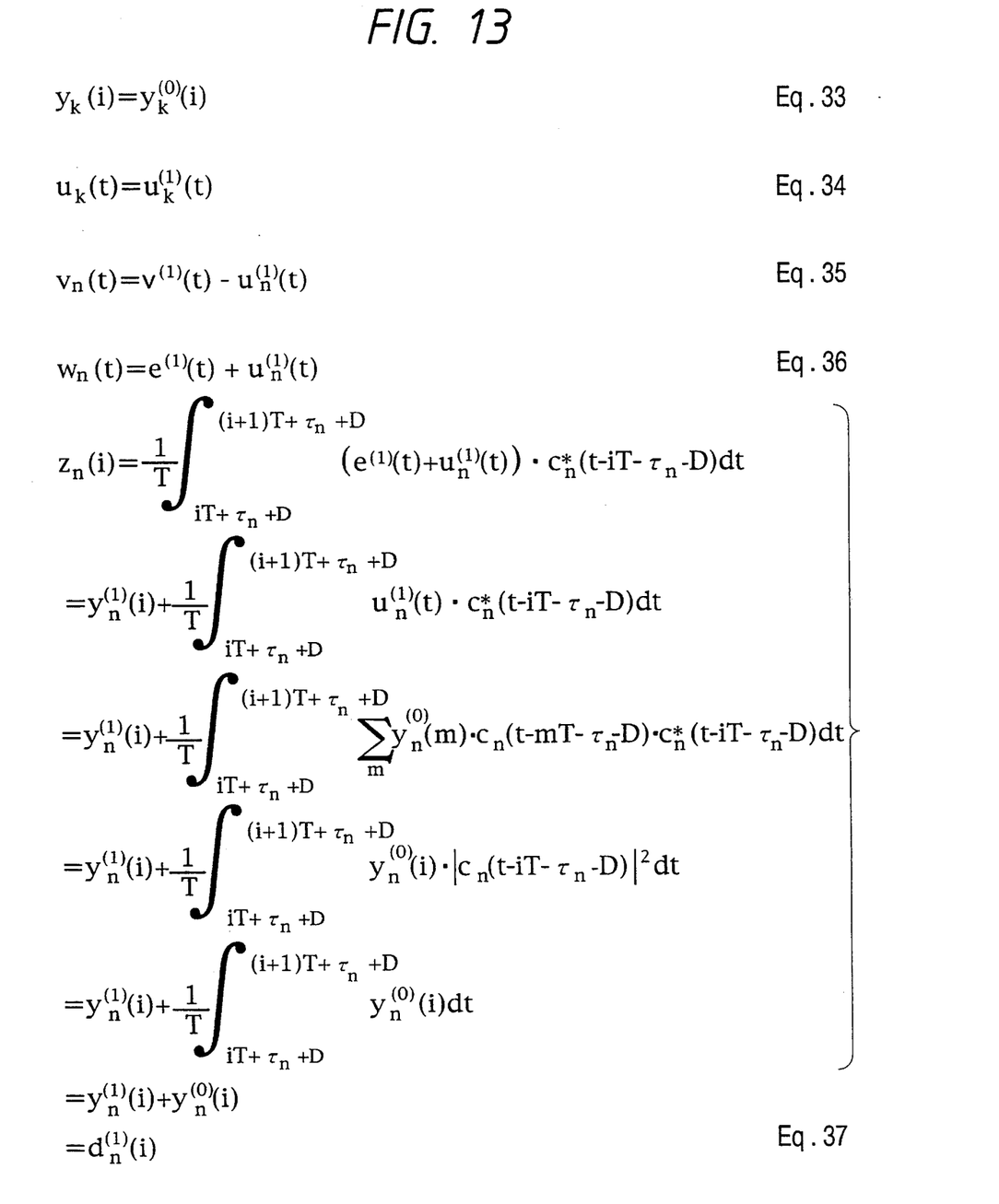
FIG. 13 shows formulas 33 to 37.

Comparing the prior art replica signal cancellation method and the spread spectrum signal canceller according to the invention, the correlator processes expressed by the formulas 2 and 23 are equivalent with respect to the same received signal expressed by the formula 1. Thus, formula 33 in FIG. 10 is satisfied. Further, the re-modulator outputs expressed by the formulas 3 and 24 are equivalent, and formula 34 in FIG. 13 is satisfied. Thus, from the formulas 4 and 25, formula 35 in FIG. 13 is satisfied. By substituting this formula into the formula 5 and modifying the result by using the relation of the formula 26, the relation of formula 36 in FIG. 13 can be obtained. By modifying the formula 6 with this relation, formulas 37 in FIG. 13 can be obtained.

Thus, it will be seen that the detected correlation output $z_n(i)$ obtained according to the prior art replica signal cancellation method and the detected correlation output $d_n^{(1)}(i)$ obtainable with the spread spectrum signal demodulator performing 1-st stage interference cancellation according to the invention are equivalent to each other.

Figure 14:
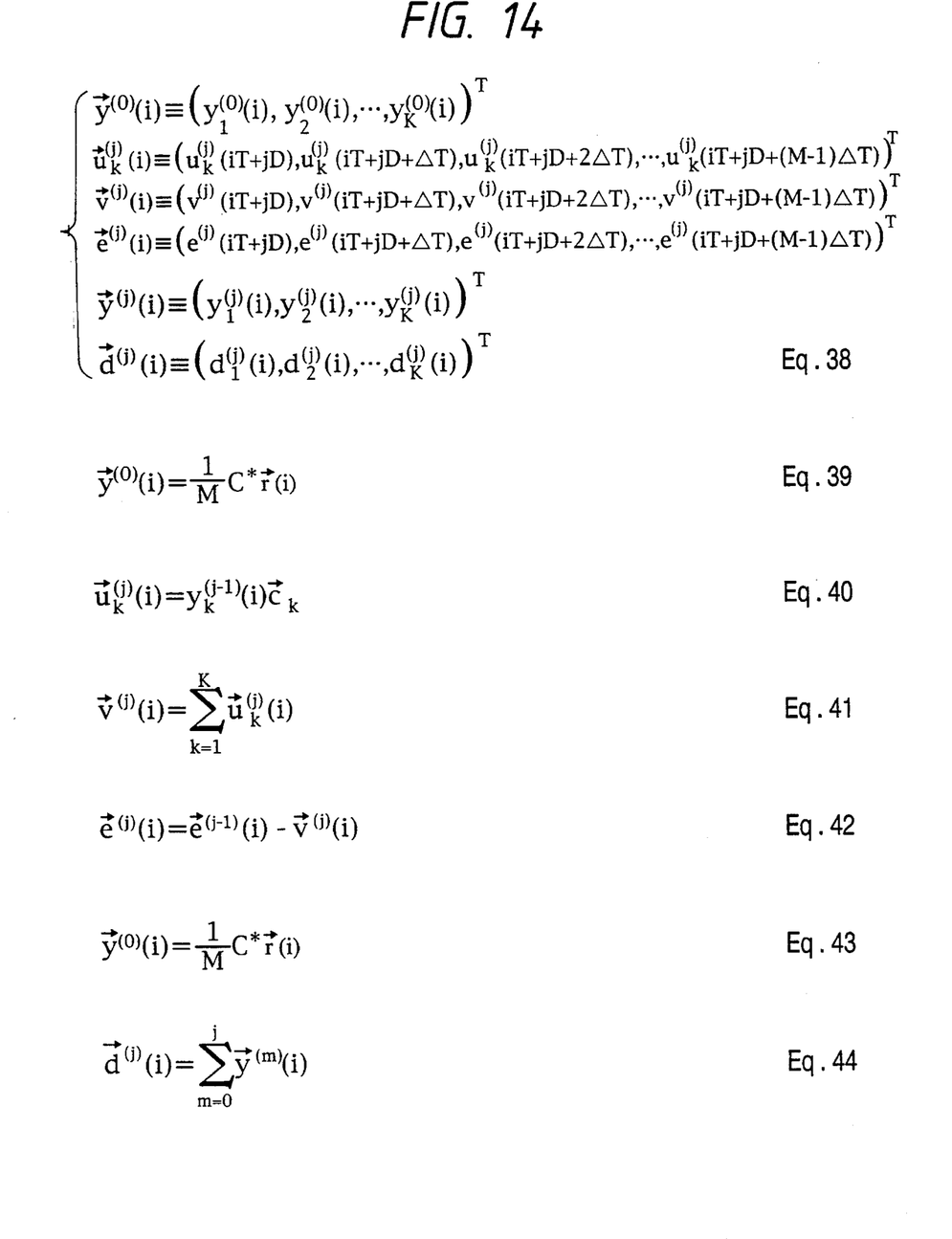
FIG. 14 shows formulas 38 to 44.

Now, comparison to the prior art decorrelating method will be made under the assumption that there is inter-signal symbol timing synchronization and that the condition of the formula 7 is satisfied. In this case, signals in various parts of the structure shown in FIGS. 5 and 6 are expressed by vectors as shown by formulas 38 in FIG. 14. By using the vector expression, the above formula 23 can be modified to formula 39 in FIG. 14. In addition, the formulas 24 to 28 can be modified to formulas 40 to 44 in FIG. 14 respectively. Using the formulas 40 to 42 the formula 43 can be modified to formula 45 in FIG. 15, where E represents a unit matrix of K×K in size.

Figure 15:
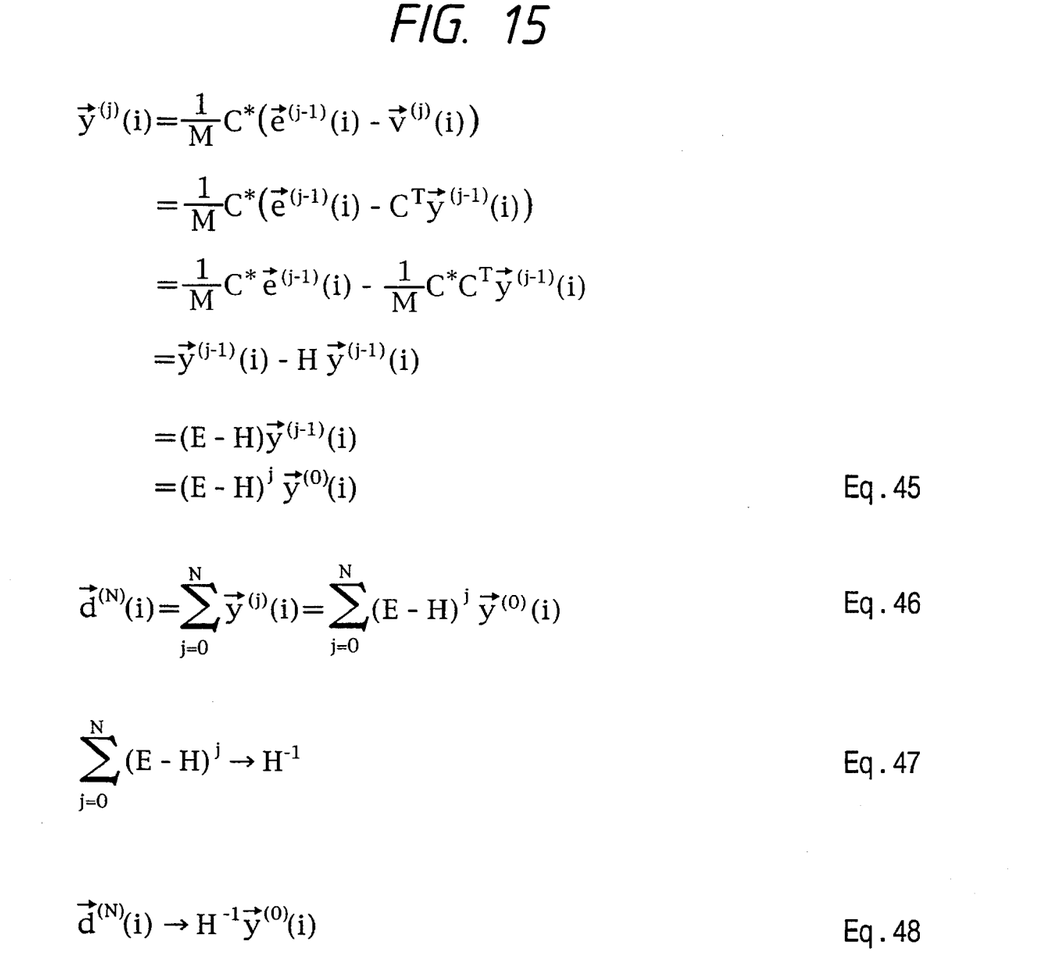
FIG. 15 shows formulas 45 to 48.

Thus, the sum of the detected correlations up to the N-th one is expressed by formula 46 in FIG. 15. If the absolute value of the determinant of the matrix (E−H) is less than unity, with N→∞ formula 47 in FIG. 15 is satisfied.

Consequently, the detection value $d_k^{(N)}(i)$ obtained 10 with the spread spectrum signal demodulator according to the invention approaches the detection value $d_k(i)$ obtainable by the decorrelating method by increasing the number N of stages, as is obvious from the formula 19.

In the case of absence of the symbol timing synchronization among signals, through vector expression modification of each signal in a sufficiently long period MT over a plurality of (i.e., M) symbols, it is possible like the case of presence of synchronization that the detection value according to the invention can approach one in the decorrelation method by increasing the number N of stages. In other words, it will be seen that irrespective of whether the symbol timings are synchronous or asynchronous, increasing the number N of stags permits the detection value obtainable with the spread spectrum signal demodulator according to the invention to approach the detection value obtainable by the decorrelating method, thus permitting the demodulation characteristics to approach those in the decorrelation method.

Comparing the prior art replica signal cancellation method and the spread spectrum demodulator performing 1-st stage interference cancellation according to the invention, as described before, the detected correlation output $z_n(i)$ obtainable with the prior art replica signal cancellation method and the 1-st detected correlation output $d_n^{(1)}(i)$ obtainable with the above spread spectrum signal demodulator according to the invention are equivalent.

Meanwhile, the process amounts required with the correlator and the re-modulator are equal, and the summation of correlations in the system according to the invention has to be done only once for each symbol of each signal. Thus, the process amount can be substantially ignored compared to other processes. This means that the difference of the process amount is constituted by the arithmetic operations which are required for each sample in the case of the digital processing. With the prior art replica signal cancellation method, it is necessary to perform arithmetic operation a number of times substantially equal to the square of the number K of signals for each sample for the processes of the formulas 4 and 5, whereas with the spread spectrum signal demodulator performing 1-st stage interference cancellation according to the invention it is necessary to perform only K times of arithmetic operation for the processes of the formulas 25 and 26.

In other words, with the spread spectrum signal demodulator performing 1-st stage of interference cancellation according to the invention, less process amount than in the case of the prior art replica signal cancellation method is needed to obtain equivalent demodulation characteristics. Besides, the degree of reduction of the process amount with respect to the prior art method is increased with increasing number of signals.

The characteristics of the spread spectrum signal demodulator performing multi-stage of interference cancellation according to the invention, as described before, approaches more and more the characteristics of the prior art decorrelating method by increasing the number of stages of the interference cancellation. In addition, by so doing, the system becomes stronger with respect to near-far problems. Further, according to the invention an increase or decrease of the number of signals can be coped with in a manner that in each stage circuits such as correlators, re-modulators, etc. corresponding to the number of signals are operated. Further, spreading code alteration or changes or delay changes may be coped with by merely altering the values of the spreading code or delay used in the corresponding circuits such as correlators or re-modulators.

That is, while the prior art decorrelating method dictates an enormous process amount of the re-calculation of inverse matrix with respect to an increase or decrease of the number of signals, spreading code alteration or changes or delay changes, according to the invention no particular process is necessary to cope with such respects. Particularly, in such environment as mobile communication subject to frequent increases and decreases of signals, spreading code alteration and changes and delay changes, according to the invention it is possible to obtain overall characteristics close to those of the prior art decorrelation method with far less process amount.

As has been described in the foregoing, the invention can be suitably applied to spread spectrum signal demodulators in cellular mobile communication systems, in which a large number of indefinite signals are transmitted in the same band by CDMA, and which is subject to instantaneous signal delay changes and frequent signal number increase and decrease with accompanying spreading code alterations. Thus, the invention can contribute to channel capacity increase of such systems, improvement of the communication quality and reduction of the system scale and power consumption.

What is claimed is:

1. A spread spectrum signal demodulator receiving as input signal a sum of a plurality of spread spectrum signal, comprising:

means for obtaining the correlation of a spreading code assigned to each of the spread spectrum signals contained in the input signal and the input signal for each symbol of the spread spectrum signal and making the correlation to be a zero detected correlation signal;

a first interference canceller stage for receiving the input signal and the zero detected correlation signal and outputting a first residual error signal, a first detected correlation signal and a sum signal representative of a sum of the zero and first detected correlations signals; and a plurality of interference canceller stages serially connected together and to the first interference canceller stage, each interference canceller stage of the plurality of interference canceller stages receiving from the previous interference canceller stage a residual error signal, a detected correlation signal, and a sum signal representative of a sum of all previously detected correlation signals and outputting further a residual error signal, a detected correlation signal, and a sum signal representative of a sum of all detected correlation signals through the respective each interference canceller stage.

2. The spread spectrum signal demodulator according to claim 1, wherein when j is an integer greater than zero, a j-th interference canceller stage includes:

means for generating a j-th re-spread signal by multiplying the (j−1)-th detected correlation by the spreading code assigned to a corresponding spread spectrum signal;

means for making a signal, which is obtained by summing each of the j-th re-spread signals obtained for all the spread spectrum signals at corresponding spread spectrum signal symbol timings, to be a j-th replica signal;

means for making a signal, which is obtained by subtracting the j-th replica signal from a signal obtained by delaying the input signal when j=1 and from the (j−1)-th residual error signal when j is an integer greater than 1, to be a j-th residual error signal;

means for making a signal, which is obtained by deriving the correlation between the spreading code and the j-th residual error signal for each spread spectrum signal symbol, to be a j-th detected correlation; and means for deriving the sum of the zero to (j−1)-th detected correlations.

3. A spread spectrum signal demodulator receiving as input signal a sum of a plurality of spread spectrum signals, comprising:

means for making a correlation, which is obtained between a spreading code assigned to each of the spread spectrum signals contained in the input signal and the input signal for each spread spectrum signal symbol, to be a zero detected correlation;

a first interference canceller stage for receiving as inputs a first delay signal obtained by delaying the input signal and the zero detected correlation and outputting the first delay signal and a sum signal representative of a sum of the zero and first detected correlations; and a plurality of interference canceller stages serially connected together and to the first interference canceller stage, each interference canceller stage of the plurality of interference canceller stages receiving from the previous interference canceller stage a delay signal and a sum signal representative of a sum of all previous detected correlation signals, delaying the delay signal, and further outputting the delay signal as further delayed and a sum signal representative of a sum of all detected correlation signals through the respective each interference canceller stage.

4. The spread spectrum signal demodulator according to claim 3, wherein when j is an integer greater than zero, a j-th interference canceller stage includes:

means for generating a j-th re-spread signal by multiplying the sum of the zero to (j−1)-th detected correlations by a spreading code assigned to a corresponding spread spectrum signal;

means for making a signal, which is obtained by summing each of the j-th re-spread signals obtained for all the spread spectrum signals at corresponding spread spectrum signal symbol timings, to be a j-th replica signal;

means for making a signal, which is obtained by subtracting the j-th replica signal from a signal obtained by delaying the input signal by a time corresponding to j stages, to be a j-th residual error signal;

means for making a correlation, which is obtained between the spreading code and the j-th residual error signal for each spread spectrum signal symbol, to be the j-the detected correlation; and means for deriving the sum of the zero to j-th detected correlations by adding the j-th detected correlation to the sum of the zero to (j−1)-th detected correlations.

* * * * *